July 22, 1930. M. E. DAVIS 1,771,166
PROCESS FOR APPLYING PAINTS OR CEMENTS TO SKIVED ARTICLES OR THE LIKE
Filed Nov. 13, 1929
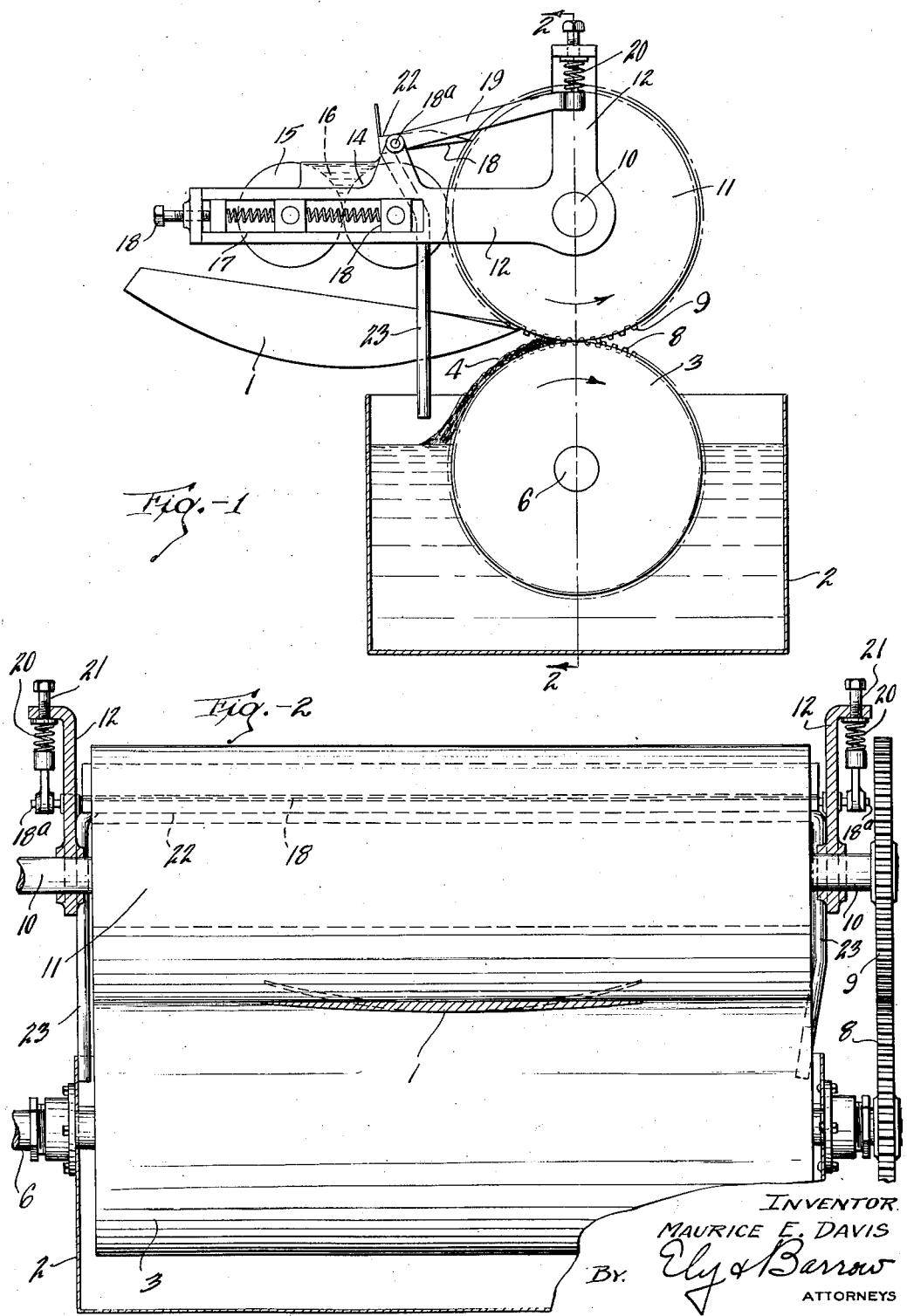
INVENTOR
MAURICE E. DAVIS
BY Ely & Barrow
ATTORNEYS Patented July 22, 1930

1,771,166

UNITED STATES PATENT OFFICE

MAURICE E. DAVIS, OF GRAND RAPIDS, MICHIGAN, ASSIGNOR, BY MESNE ASSIGN-
MENTS, TO HARRY E. MOYSES, OF AKRON, OHIO

PROCESS FOR APPLYING PAINTS OR CEMENTS TO SKIVED ARTICLES OR THE LIKE

Application filed November 13, 1929. Serial No. 406,750.

The present invention relates to the preparation of articles of fabric or fabric and rubber such as tire patches, blow-out patches or boots made from plies of tire fabric or similar materials. For the purpose of illustrating the invention it will be described as applied particularly to the application of paints or cements to tire patches but it will be understood that the invention is not necessarily limited to this identical material or exact process.

Tire patches are of several layers of vulcanized rubberized fabric usually made from old tire casings by cutting out a patch of suitable size from the tire, the edges of the patch being skived or brought to feather edges. These patches are curved both longitudinally and transversely to fit against and conform to the inner surface of the tire and the skived edges are provided so that abrupt or sharp edges about the patch is eliminated. In the preparation of these patches, it is usual to provide the outer or convex surface which fits against and adheres to the tire with a sticky or adhesive coating usually of a rubber cement, which coating is tacky and fastens the patch securely to the inner surface of the tire. The inner or concave surface which contacts the tube is provided with a non-adhesive coating, usually a solution of rubber having a large percentage of mica or similar material contained therein so that the tube does not adhere to the patch.

It is necessary that the respective coatings be confined to their proper surfaces, and this problem has made it impossible heretofore to apply the coatings by machinery and the operations have been performed by hand.

It is the object and purpose of the invention to provide a process and apparatus by which the respective coatings may be applied by machinery and so far as known to me, the present invention is the first to perform these operations successfully in any manner except by manual application of the coating materials.

In the drawings there is illustrated an effective and operative machine for the simultaneous application of the adhesive and non-adhesive coatings to the opposite sides of the patches. It will be understood, however, that the simultaneous application of the two coatings is not necessary to the satisfactory operation of the machine and a machine may be used to apply either of the coatings separately.

In the drawings,

Figure 1 is a side elevation of the machine; and

Figure 2 is a front view thereof.

The patch is illustrated at 1, being curved in both directions as has been described. It may be flattened out under pressure but owing to its resilient and elastic qualities, if it be flattened out there is a tendency for the patch to reassume its curved condition, which action creates a tension about the edges of the patch which causes it to cling to a surface against which it is forced. This property of the patch is utilized in the present invention for the successful application of the coating materials.

The tacky or adhesive coating is contained in a tank or reservoir 2, being maintained at a proper level therein by any suitable automatically regulated feeding device (not shown). In the tank 2 there is located the applying roller 3 which dips in the cement and conveys a supply thereof to the upper surface of the roll where it will collect in a bank or pool 4. The roll 3 may be made of any suitable soft or yielding composition so that it will receive and embed the patch therein. Or, if desired, a brush may be substituted for the roll, the character of the roll being determined in some measure by the composition of the adhesive coating.

The roll or brush 3 is supported in bearings in any suitable framework and the shaft 6 is driven by a pulley (not shown). At one end it is provided with a gear 8 which meshes with a similar gear 9 on the shaft 10 of the upper roll 11. This roll 11 is a metal roll which is held in contact with the lower roll or brush.

Mounted upon the shaft 10 is an angular frame or arm 12 which extends to the side of the roll 11 and supports two rolls 14 and 15 which apply the non-adhesive coating material to the upper roll. The rollers 14 and 15 are made of yielding material. The roller 14 bears against the roller 11 and the roller 15 against the roller 14 so as to provide a well or trough 16 in which a pool of the non-adhesive coating is retained. Any desirable feeding mechanism may be provided for keeping the trough supplied with this material. The shafts of the rollers 14 and 15 are mounted in sliding bearings in slots 17 in the arms 12 and spring pressure and adjusting means 18 are provided for forcing the rolls together and the roll 14 against the roll 11.

It is necessary to remove the adhesive material applied to the roller 11, at the surfaces not covered by the patch so as to prevent this material from reaching the concave side of the patch and to provide a clean surface for the application of the non-adhesive coating by the roller 14. For this purpose there is provided the scraper bar 18 which extends along the entire width of the roller 11, being pivoted at 18ª on the arm 12. Levers 19 attached to either side of the scraper extend forwardly and are pressed downwardly by coil springs 20 which are compressed by the screws 21 on the arm 12. In this manner the scraper is forced against the roll 11 and removes all of the adhesive cement therefrom. This collects in a trough 22 at the rear of the scraper from whence it is returned to the tank by pipe 23.

In operation of the machine, the tire patch is presented to the roll 11 with the concave side uppermost, the operator taking care to contact the forward edge against the roll above the pool, which prevents any adhesive coming in contact with the inside of the patch. The patch is flattened out by the operator against the roll 11 and is then passed between the rolls. The natural tendency of the patch to curve upwardly, as shown by the dotted lines in Figure 2, causes the edges to seal against the surface of the roll and thereby prevents any of the adhesive cement from the roll 3 passing on to the inside of the patch. The roll 11 will apply the non-adhesive coating to the upper surface of the patch, such of this material as finds its way on to the lower roll 3 being absorbed by the sticky adhesive without injury to the latter. The scraper 18 will, however, remove this adhesive from the roller so that it will not be taken up by the non-adhesive coating.

It will be appreciated that exact conformity with the details of the invention is required and that various embodiments thereof may be made, all within the scope of the invention as set forth in the claims.

What is claimed is:—

1. The process of applying a coating to a surface of a concavo-convex flexible and resilient article, such as a tire patch, comprising flattening the article against a surface so that the tension in the article resulting from such flattening will seal the edges, and applying a coating to a surface of the article while so held.

2. The process of applying a coating to a surface of a concavo-convex flexible and resilient article, such as a tire patch, comprising flattening the article against a surface so that the tension in the article resulting from such flattening will seal the edges, and applying a coating to the convex side of the article while so held.

3. The process of applying different coatings to the opposite surfaces of a concavo-convex flexible and resilient article, such as a tire patch, comprising holding the concave side of the article against a surface to which one of the coatings has been applied so that that side is coated by contact with the surface, and applying the second coating to the normally convex surface while the article is held as described.

4. The process of applying different coatings to the opposite surfaces of a concavo-convex flexible and resilient article, such as a tire patch, comprising holding the concave side of the article against a surface to which one of the coatings has been applied so that that side is coated by contact with the surface and the edges of the article are sealed against the surface by tension, and applying the second coating to the normally convex surface while the article is held as described.

5. The process of applying a coating to the convex side of a concavo-convex flexible and resilient article, such as a tire patch or the like, comprising flattening such article by pressure applied to its convex side against a surface whereby the edges of the article due to such flattening are under tension, and while so held applying the coating over a surface of the article.

6. The process of applying a coating to a side of a concavo-convex flexible and resilient article such as a tire patch or the like, comprising progressively flattening the article by pressure applied to its convex side against a surface whereby the edges of the article due to such flattening are under tension, and simultaneously applying a coating to said side of the article.

7. The process of applying different coatings to opposite sides of a concavo-convex flexible and resilient article, such as a tire patch or the like, comprising progressively flattening the article by pressure applied to its convex side against a coated surface, whereby the concave side of the article is coated and the edges of the article placed under tension due to such flattening, and simultaneously applying a coating to the convex side of the article.

8. The process of applying a coating to a surface of a concavo-convex flexible article comprising progressively flattening the article against a yielding surface to embed said article including its edges in said surface so that the tension in the edges of the article resulting from such flattening will seal the edges and progressively applying a coating to a surface of the article while it is so flattened.

MAURICE E. DAVIS.